US012597259B1

(12) United States Patent
Jong et al.

(10) Patent No.: US 12,597,259 B1
(45) Date of Patent: Apr. 7, 2026

(54) INTELLIGENT VISION CHECKOUT SYSTEM AND METHOD PROVIDING ENHANCED USER INTERACTION

(71) Applicant: NCR Voyix Corporation, Atlanta, GA (US)

(72) Inventors: Wuchieh James Jong, Raleigh, NC (US); Gina Torcivia Bennett, Lawrenceville, GA (US); Kip Oliver Morgan, Atlanta, GA (US); Angelique Dale, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/990,173

(22) Filed: Dec. 20, 2024

(51) Int. Cl.
| | |
|---|---|
| *G06V 20/52* | (2022.01) |
| *G06Q 20/20* | (2012.01) |
| *G06Q 20/32* | (2012.01) |
| *G06V 10/764* | (2022.01) |
| *G06V 10/94* | (2022.01) |

(52) U.S. Cl.
CPC ........... *G06V 20/52* (2022.01); *G06Q 20/208* (2013.01); *G06Q 20/3276* (2013.01); *G06V 10/764* (2022.01); *G06V 10/945* (2022.01)

(58) Field of Classification Search
CPC .... G06V 20/52; G06V 10/764; G06Q 20/208; G06Q 20/3276
See application file for complete search history.

(56) References Cited

U.S. PATENT DOCUMENTS

| | | | | |
|---|---|---|---|---|
| 7,866,546 B1 * | 1/2011 | Vance | ................. | G07G 1/0009 |
| | | | | 235/383 |
| 10,628,695 B2 * | 4/2020 | Srivastava | ........... | G06V 10/809 |
| 12,367,744 B1 * | 7/2025 | Morgan | .............. | G09B 21/004 |
| 2020/0065793 A1 * | 2/2020 | Kakino | ............... | G07G 1/0063 |
| 2023/0252443 A1 * | 8/2023 | McDaniel | ........... | G06V 10/255 |
| | | | | 705/23 |
| 2023/0316786 A1 * | 10/2023 | Habib | ...................... | G06T 7/70 |
| | | | | 382/154 |

* cited by examiner

*Primary Examiner* — Scott S Trotter
(74) *Attorney, Agent, or Firm* — Notaro, Michalos & Zaccaria P.C.; John S. Economou

(57) ABSTRACT

A user is prompted to begin a transaction by presenting a welcome message on a display. Output images from a set of cameras are forwarded to a machine learning model trained to identify items on a checkout tray during the transaction once no movement is detected on the checkout tray. An identification of an error state designating a particular error is received from the machine learning model and, in response, the user is provided with an error message on the display identifying the particular error. Once it is determined that the error state has been cleared, output images from the set of cameras are forwarded to the machine learning model trained to identify the items on the checkout tray. An identification of the items on the checkout tray is received and the identified items are added to a list of items to be purchased shown on the display.

18 Claims, 12 Drawing Sheets

530

532

534

540

550

552

564

560

562

570

572

600

INTELLIGENT VISION CHECKOUT SYSTEM AND METHOD PROVIDING ENHANCED USER INTERACTION

FIELD

This disclosure relates generally to a system and method for providing an intelligent vision checkout interface for a vision-based self-service checkout system, and more particularly to an intelligent vision checkout interface for a vision-based self-service checkout system which enhances user interaction.

BACKGROUND

Self-service checkout terminals allow a customer to perform the checkout process without the need for any assistance from a cashier or other type of attendant. One type of such terminal may include a vision system that enables automated item recognition, item tracking, and transaction handling in a self-service checkout environment. The vision system uses cameras and associated software to capture image data of items and analyze and interpret the captured image data to identify the items. During the use of such terminals, the customer places some or all of the items to be purchased onto a checkout tray that is completely within the field of view of the several cameras in the vision system. This type of terminal allows more than one pre-packaged item to be placed on the checkout tray at a time. Although this type of terminal is trained to recognize the items sold by an associated store, packaging may change and, in any event, a small portion of the items sold by the associated store will not be able to be identified by the vision system. Furthermore, the use of vision-based checkout introduces new potential errors not present in prior barcode-based checkout systems, such as 1) hand in view, 2) overlapping items, and 3) item on edge. These error must be addressed in a manner which maintains and enhances user interaction over prior checkout systems.

The present disclosure describes a technical solution that provides a vision-based self-service checkout terminal which addresses the foregoing problems.

SUMMARY

The system and method of the present disclosure relates to a vision-based checkout terminal designed to facilitate a seamless, efficient, and user-friendly self-checkout process. The terminal incorporates advanced visual recognition technology and a suite of error-handling and guidance mechanisms to optimize the user experience while minimizing errors. The following features highlight the key aspects of this system:

The system uses a bounding box that dynamically outlines the item of concern, with the background intentionally blurred to enhance the focus on the item in question. This visual distinction ensures that users can easily identify the item being processed, minimizing confusion during checkout.

To accommodate various accessibility needs, the bounding box color dynamically adjusts to avoid conflicting with the user's pre-configured accessibility settings. This feature ensures that individuals with color vision impairments or other accessibility concerns can effectively interact with the system.

The system introduces a delay mechanism for handling errors caused by a "hand in view" within the vision tray. This delay prevents false alarms by distinguishing between the "hand in view" error and other more critical error scenarios, reducing unnecessary interruptions.

When the system is unable to identify an item, the item is deemed an unrecognized item and the system prompts the user to place the item aside, ensuring that any problematic items are identified and addressed separately. This prevents delays and confusion during checkout.

The system can detect and display errors under multiple conditions, including a persistent hand in the vision tray, one or more items partially outside the detectable area, and overlapping items, i.e., when multiple items are positioned in a way that causes them to overlap or block visual recognition. These errors are flagged to the user, helping to ensure that only correctly detected items are processed.

The system is capable of suggesting products for recognition, automatically identifying specific products via vision processing. This proactive recognition minimizes the need for manual input, allowing for a faster and more efficient checkout process.

The terminal improves the process of removing items by providing clear guidance to the user, identifying the exact item to be removed and guiding them through the appropriate action.

The terminal incorporates a barcode scanner that allows users to scan items, ensuring that barcode-based identification works in conjunction with vision-based checkout. The scanner does not interfere with the vision processing system, creating a hybrid solution for maximum accuracy and convenience.

In the event that the vision server becomes offline or unavailable, the system reverts to traditional self-checkout procedures, ensuring that the transaction can still proceed without interruption.

The system preferably employs a heartbeat mechanism to continually monitor the status of the vision server. If the server becomes unresponsive or goes offline, the system automatically detects this scenario and takes appropriate action to minimize disruption.

Vision errors are not cleared until they are fully addressed. This ensures that issues are not overlooked, providing the user with ample opportunity to correct any mistakes before the system proceeds with the transaction.

The system directs the user to remove non-store items from the vision tray, ensuring that only items for purchase are processed. This reduces the likelihood of errors related to unauthorized items.

When multiple items are unrecognized, the system directs the user to address them one at a time. This step-by-step guidance prevents confusion and allows for a more manageable error resolution process.

The system does not allow the user to move on to the next transaction until the vision tray is clear of any unrecognized or unresolved items. This ensures that each transaction is properly completed before the next one is initiated.

The system tracks key performance metrics specific to vision checkout, including: 1. the total number of transactions processed using vision checkout; 2. the number of unrecognized items encountered during vision checkout; 3. the outcome of unrecognized items, whether they are sold, voided, or handled in another way; and 4. the frequency and duration of vision checkout downtime or server unavailability. these statistics are critical for evaluating system performance, identifying areas for improvement, and ensuring operational efficiency.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
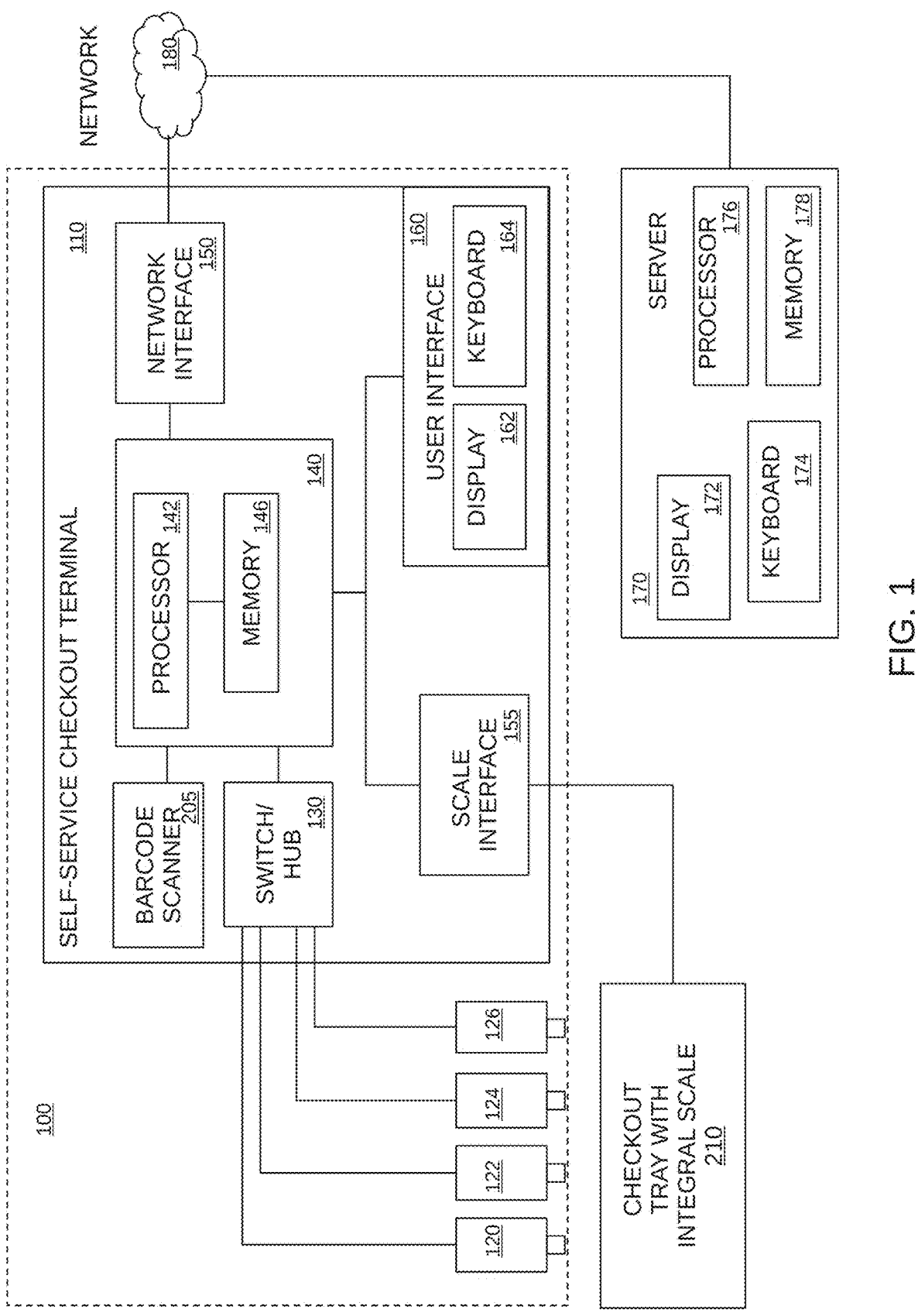
FIG. 1 is a block diagram of a system according to an aspect of the current disclosure.

The present disclosure describes an improved vision-based self-service checkout system. Referring now to FIG. 1, system 100 includes a self-service checkout terminal 110 (computing device) with computer vision for use with system and method of the present invention is shown connected to a network 180. Terminal 110 is coupled to a set of cameras (e.g., four cameras 120, 122, 124, 126 are shown in FIG. 1) that are mounted in different positions to focus on a scan zone (in particular a checkout tray 210) of the self-service checkout terminal. Because they are mounted in different positions, each of the cameras 120, 122, 124, 126 will have a different view of the scan zone for the terminal, so that the scan zone will have a particular predefined position within the field of view of each of the cameras 120, 122, 124, 126. Each of the cameras 120, 122, 124, 126 is preferably a network camera (as is known in the art) that is coupled to the computing section 110 via a network switch/hub 130 and transmits the output video image in a digital format over the network. In other embodiments, the cameras 120, 122, 124, 126 may have a composite video output that are each provided to a video switch and digitizer (not shown)

within the computing section 110 for further processing and/or viewing (i.e., converting the video signals to digital images).

Figure 3:
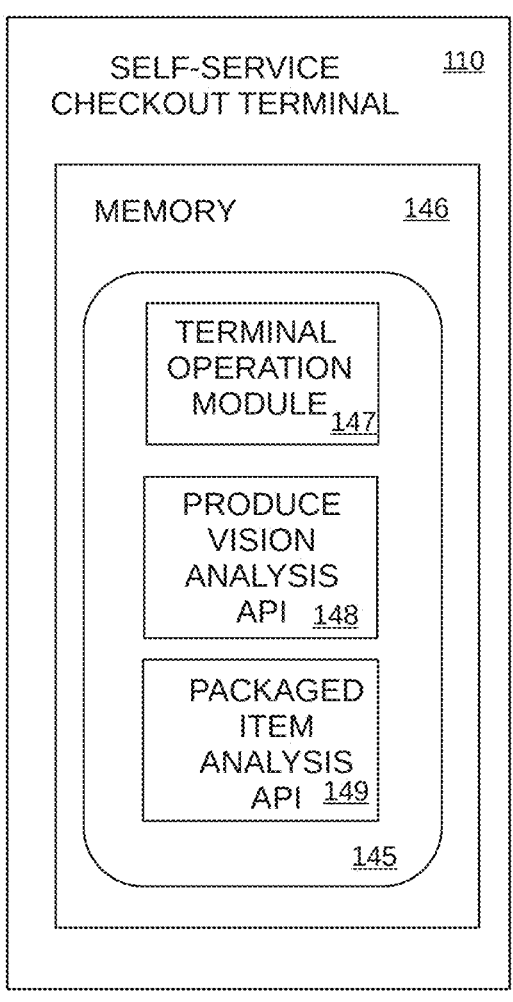
FIG. 3 is a block diagram of the memory organization for the vision-based self-service checkout terminal of the current disclosure.

The network switch/hub 130 is coupled to a processing portion 140 of terminal 110. The processing portion 140 includes a processor 142 and a memory 146. Memory 146 includes both a volatile (RAM) portion and a nonvolatile (non-transitory computer readable storage medium) portion 145 (FIG. 3). As shown in FIG. 3, the nonvolatile memory portion 145 includes a terminal operation module 147, a produce vision analysis application programming interface (API) 148, and a packaged item analysis API 149. The terminal operation module 147 provides the functionality to operate the terminal. The produce vision analysis API 148 and the packaged item analysis API 149 serve to communicate with the machine learning model, as explained below, in order to identify produce and packaged items, respectively. Terminal 110 may include more than one processing portion, e.g., one portion for processing the camera images and performing analysis thereof, and another portion for operating the checkout functions of the terminal. The processing portion 140 is coupled to a user interface 160 for input/output that includes, inter alia, a display 162 (which may be a touch-screen display) and a keyboard 164 (or other type of data entry device). The user interface 160 is used during normal operations of the terminal 110. The processing portion 140 may also be coupled to a barcode scanner 205 for use when the vision system is unable to identify an item. The barcode scanner 205 may be a separate device (e.g., a hand-held scanner) positioned adjacent to the checkout tray 210 or the checkout tray 210 may integrate a flatbed style barcode scanner 205 therein.

The checkout tray 210 includes an integrated digital scale that provides a digital output signal (representing the weight of any items on the surface of the checkout tray 210) to the processing portion 140 via a scale interface 155. The checkout tray 210 preferably is formed with a non-reflective outer surface in order to improve the identification of items placed thereon.

Computing section 110 also includes a network interface 150 coupled to processing portion 140 and further coupled to a network 180 at a retail store site.

Figure 4:
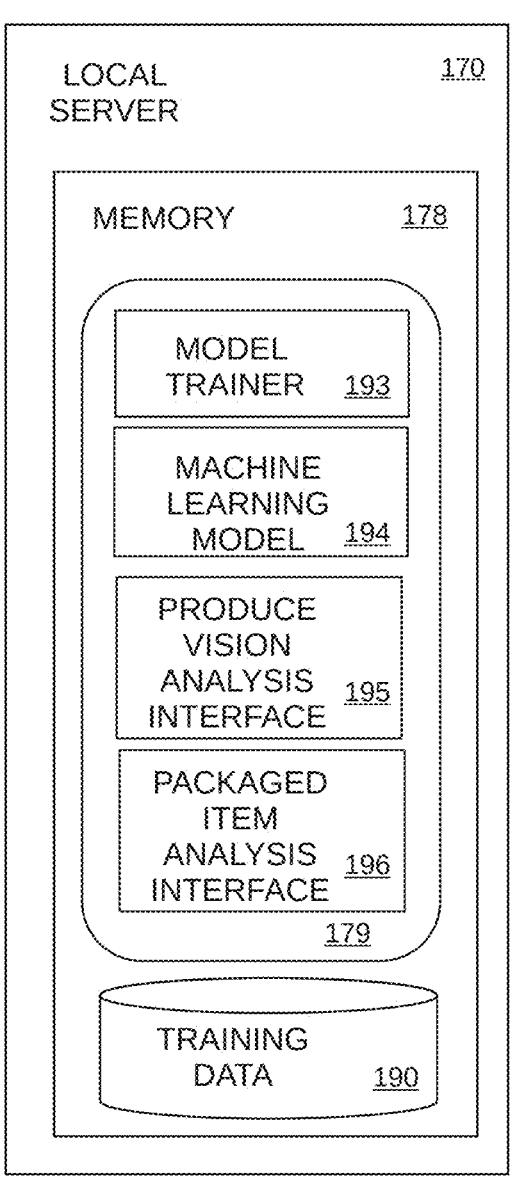
FIG. 4 is a block diagram of the memory organization for a local for use in the system of the current disclosure.

A server 170 may be coupled to the network 180. Server 170 may be located locally at the retail location and manage all of the terminals 110 at that particular retail location or may be located remotely, e.g., cloud-based. The server 170 includes, inter alia, a processor 176, a memory 178, a display 172, and a keyboard (or other user input device) 174. Memory 174 includes both a volatile (RAM) portion and a nonvolatile (non-transitory computer readable storage medium) portion 179 (FIG. 4). As shown in FIG. 4, the nonvolatile memory portion 179 includes a produce vision analysis interface 195, a packaged item analysis interface 196, a model trainer 193, and a machine learning model 194. The produce vision analysis interface 195 communicates with the produce vision analysis API 148 in the terminal 110 to receive information to be provided as in input to the machine learning model 194 and receives the output from the machine learning model 194 for transmission back to the produce vision analysis API 148. The packaged item analysis interface 196 communicates with the packaged item analysis API 149 in the terminal 110 to receive information to be provided to the machine learning model 194 and receives the output from the machine learning model 194 for transmission back to the packaged item analysis API 149. The model trainer 193 operates to train the machine learning model 194 to identify produce and packaged items using training data 190. Memory 178 may also include the training data 190 for use by the model trainer 193 to train the machine learning model 194.

Figure 2:
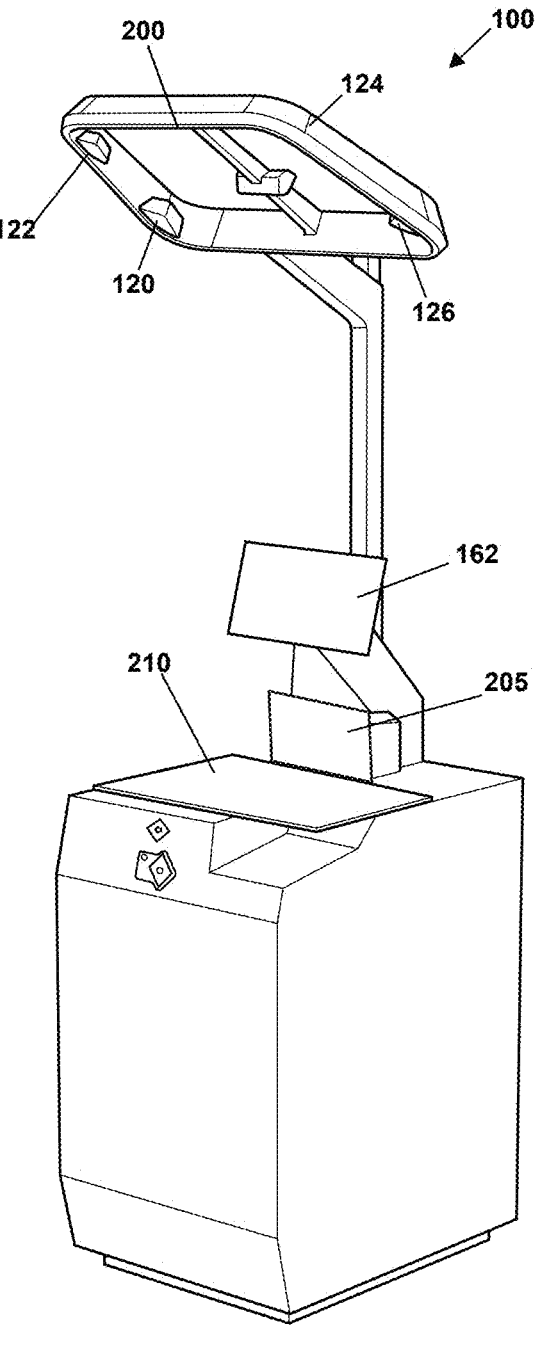
FIG. 2 is a functional drawing of a vision-based self-service checkout terminal for use in the system of the current disclosure.

Referring now to FIG. 2, a functional drawing of the vision-based self-service checkout terminal 110 shows two cameras 120, 122 mounted on a structure 200 while the other two cameras 124, 126 are positioned inside the structure 200 at the points shown in FIG. 2. As discussed above, the cameras 120, 122, 124, 126 are positioned to provide a view of the checkout tray 210. The vision-based self-service checkout terminal 110 also includes the display 162 and the bar-code scanner 205.

The model trainer 193 trains the machine learning model 194 to identify produce and packaged items using training data 190. The training data 190 consists of images of the packaged items and produce sold at the retail location. Although a single machine learning model 194 is shown in FIG. 4, separate models can also be used, one for produce identification and another for packaged items. Furthermore, one or both of the models may have sequential portions, with an initial portion performing a coarse determination and a final portion performing the final determination.

Figure 5:
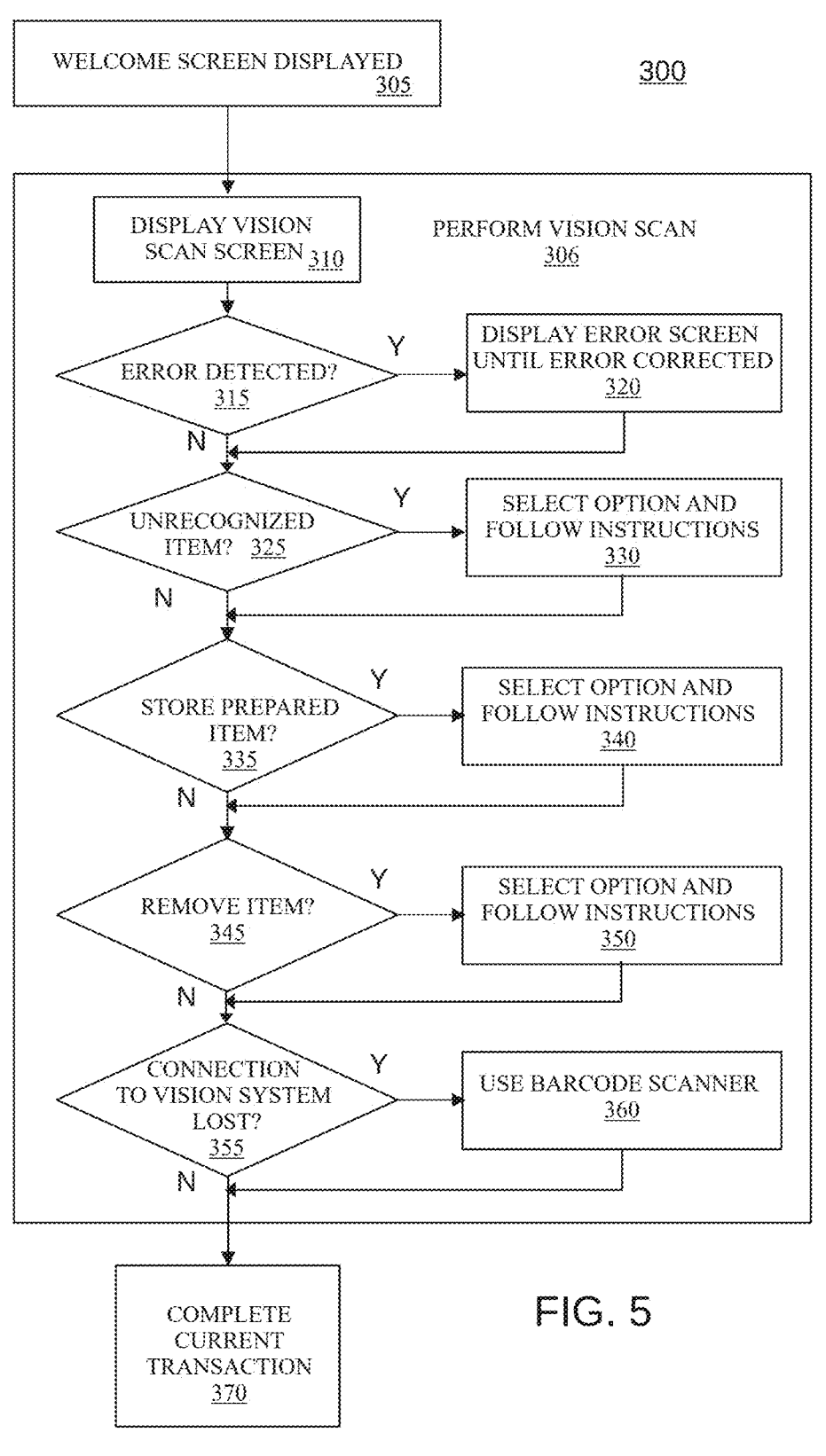
FIG. 5 is a flowchart of a method of operation of the system of the current disclosure.
Figure 6:
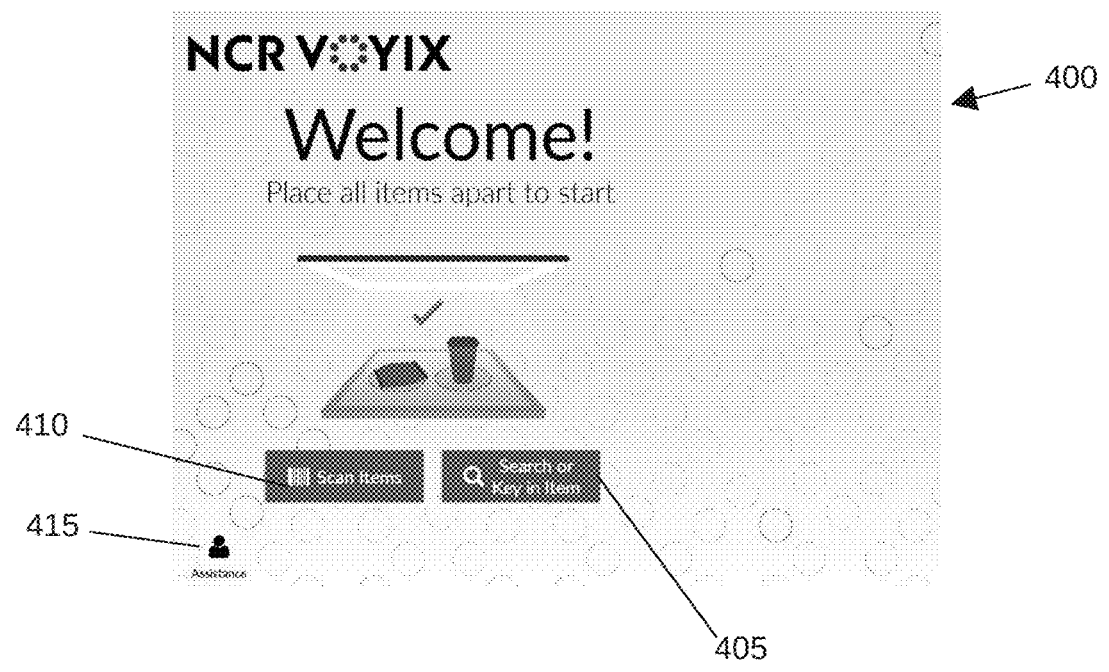
FIG. 6 is the initial display screen shown during the operation of the method of the current disclosure.
Figure 7:
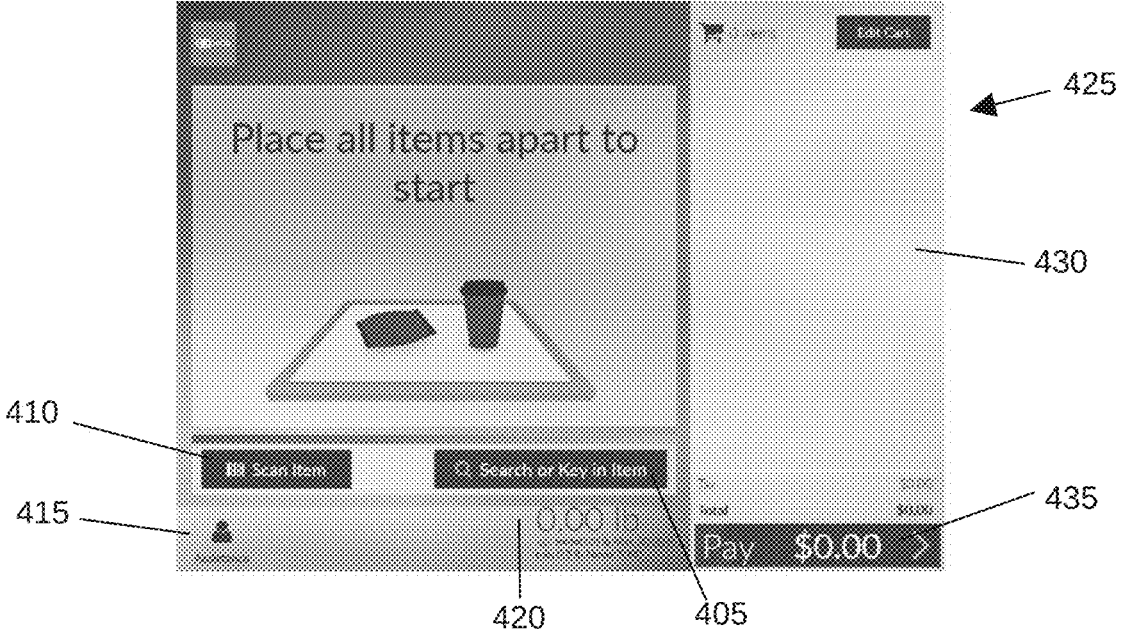
FIG. 7 is the itemization screen which displays a list of the items being sold during a transaction in the method of the current disclosure.

Referring now to the flowchart 300 of FIG. 5, the vision-based self-service checkout terminal 110 first displays a welcome screen 400 (FIG. 6) on display 162 at the beginning of a transaction (step 305). The welcome screen 400 provides an opening message to a user and includes a "scan item" button 410 (each use of a button on a screen herein refers to a user-selectable option), a "search or key in item" button 405, and an "attendant" button 415.

The vision-based self-service checkout terminal 110 then begins the vision checkout process 306 and displays the vision checkout screen 425 on display 162 once no movement is detected on the checkout tray 210 (step 310). The vision checkout screen also includes "scan item" button 410, "search or key in item" button 405, and "attendant" button 415. In addition, an area 420 display a weight amount (e.g., for produce), an area 430 that lists all of the vision identified or manually scanned items, and an area 435 that provides a running total of the current transaction.

Figure 8A:
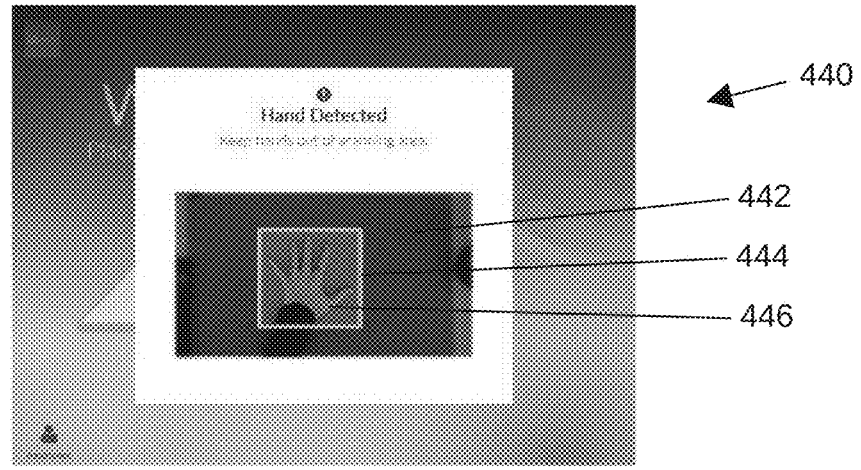
FIGS. 8A, 8B and 8C are the error display screens that may be shown during the vision scan portion of the operation of the method of the current disclosure.
Figure 8B:
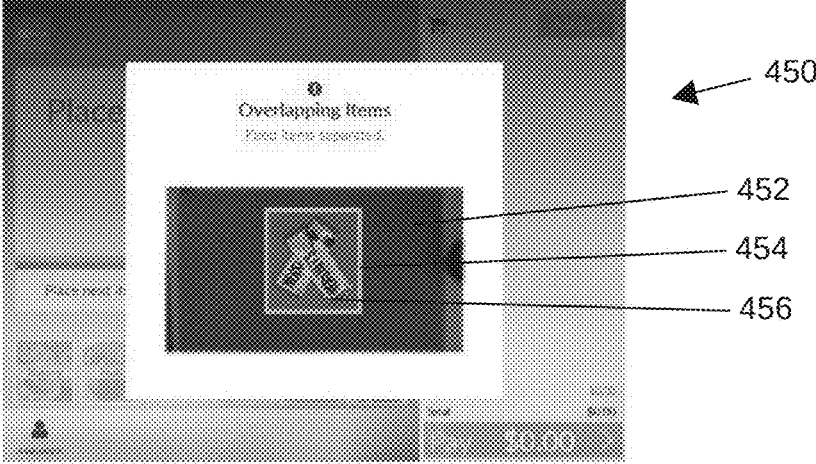
Figure 8C:
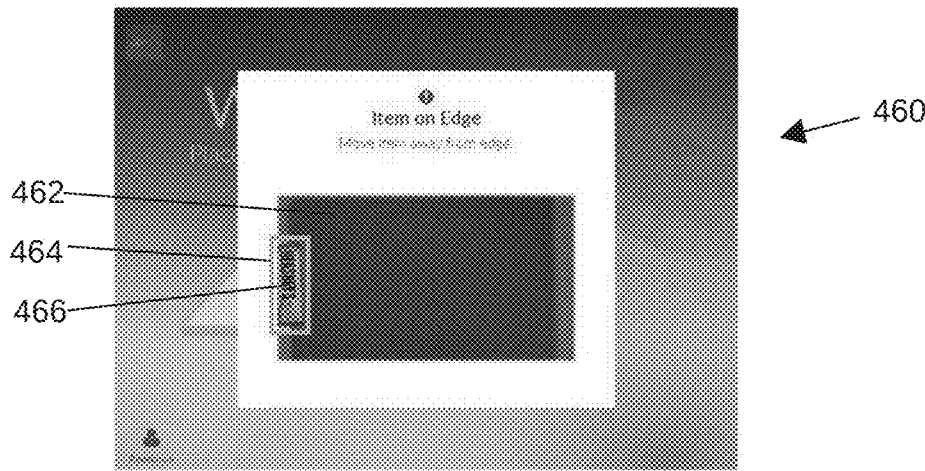

During the vision checkout process, if an error relating to item positioning or improper items on the display screen is detected (step 315), processing proceeds to step 320 where an error screen is displayed on display 162 until the error is corrected. Three errors screens may be provided. First, a hand detected error screen 440, shown in FIG. 8A, provides a view 446 of the user's hand on the checkout tray 210, the view 446 surrounded by a bounding box 444 and the remaining part 442 of the checkout tray blurred or otherwise blacked out to aid in identifying where the hand is improperly positioned. Second, an overlapped items error screen 450, shown in FIG. 8B, provides a view 456 of the overlapped items on the checkout tray 210, the view 456 surrounded by a bounding box 454 and the remaining part 452 of the checkout tray blurred or otherwise blacked out to aid in identifying the location of the overlapped items. Third, an item on edge error screen 460, shown in FIG. 8C, provides a view 466 of the item protruding over an edge of the checkout tray 210, the view 466 surrounded by a bounding box 464 and the remaining part 462 of the checkout tray blurred or otherwise blacked out to aid in identifying the location of the item protruding over the edge of the checkout tray. Each screen 440, 450, 460 instructs the user to correct the error, and once corrected, processing proceeds.

Figure 9A:
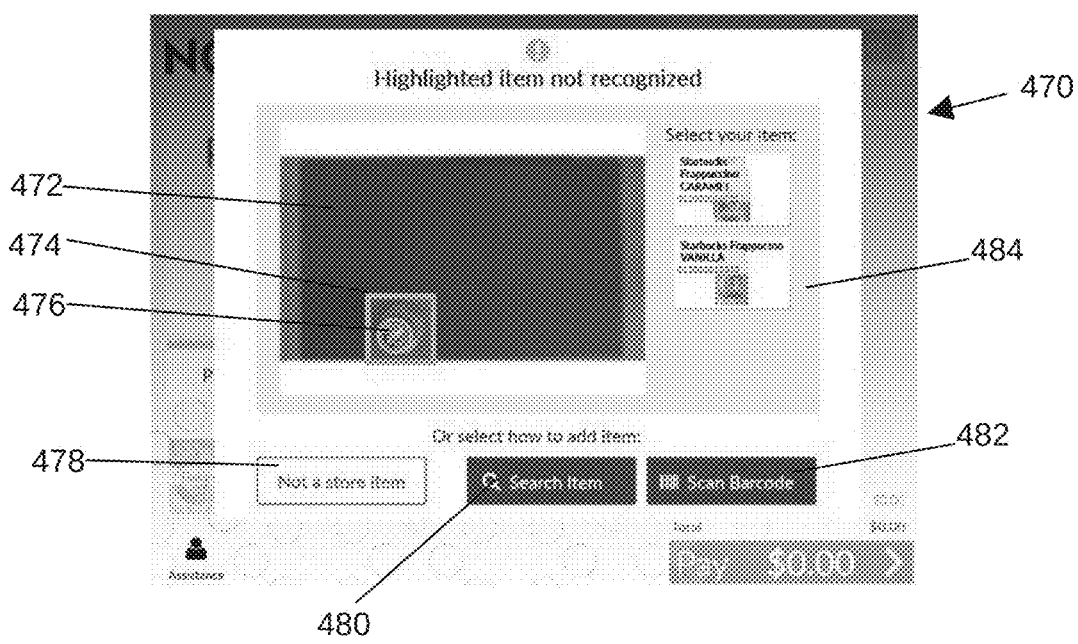
FIGS. 9A, 9B and 9C are the display screens that may be shown when an item is not recognized during the vision scan portion of the operation of the method of the current disclosure.
Figure 9B:
Figure 9C:
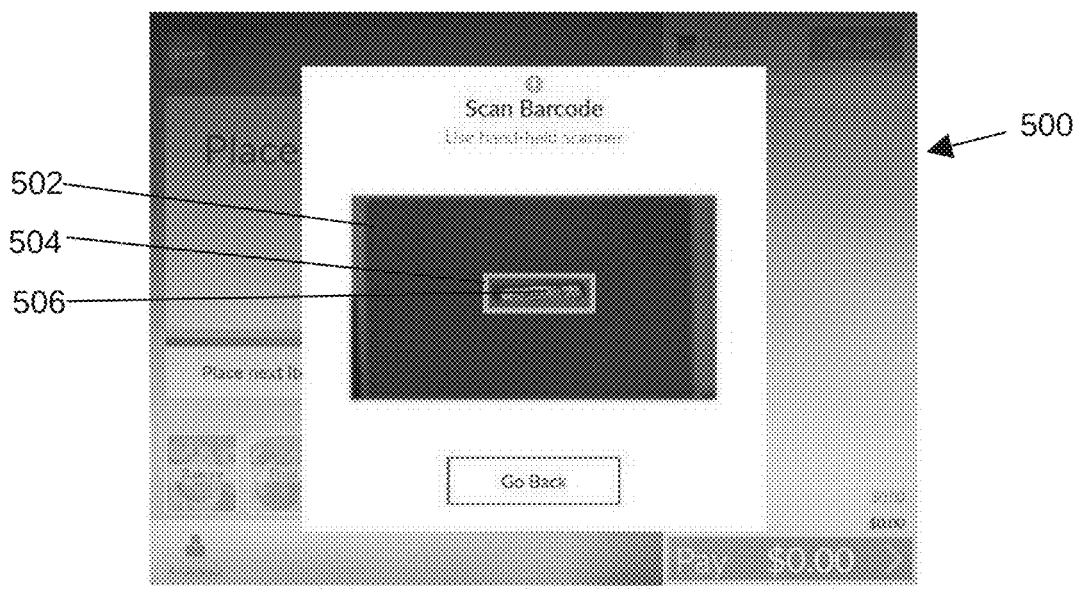

In addition, during the vision checkout process, if an error related to an unrecognized item is detected (step 325), processing proceeds to step 330 where an unrecognized item screen 470 (FIG. 9A) is displayed on display 162. The unrecognized item screen 470 provides a view 476 of the unrecognized item on the checkout tray 210, the view 476 surrounded by a bounding box 474 and the remaining part 472 of the checkout tray blurred or otherwise blacked out to aid in identifying the location of the unrecognized item. The user is provided with four options in addressing the unrecognized item. First, the user may select one of the items shown in a suggested item area 484 of screen 470. The items in the suggested item area 484 are preferably presented in ranked order, with the most likely items at the top of the list. Next, the user may select the "not a store item" button 478, after removing the item shown in the view 476, when the item is not an item for sale (e.g., if the user's car keys are on the checkout tray 210). If the unrecognized item is a store item, the user may select a "search item" button 480 or a "scan item" button 482. When the user selects the "search item" button 480, a screen 490 is displayed (FIG. 9B) which allows the user to enter an item number or code in a text box 492 using a keypad 494 to search for the unrecognized item, e.g., via a picklist. Screen 490 may also include an area 496 which provides additional suggested items. When the user selects the "scan item" button 482, a screen 500 is displayed (FIG. 9C) which provides a view 506 of the unrecognized item on the checkout tray 210, the view 506 surrounded by a bounding box 504 and the remaining part 502 of the checkout tray blurred or otherwise blacked out to aid in identifying the location of the unrecognized item. The user is instructed to use a hand-held scanner to identify the item, and processing reverts to the vision scan process when the item is identified. When the unrecognized item is identified for sale, the user is instructed to set the items aside, e.g., in the bagging area, so as to not further disrupt the vision scanning process.

Figure 10:
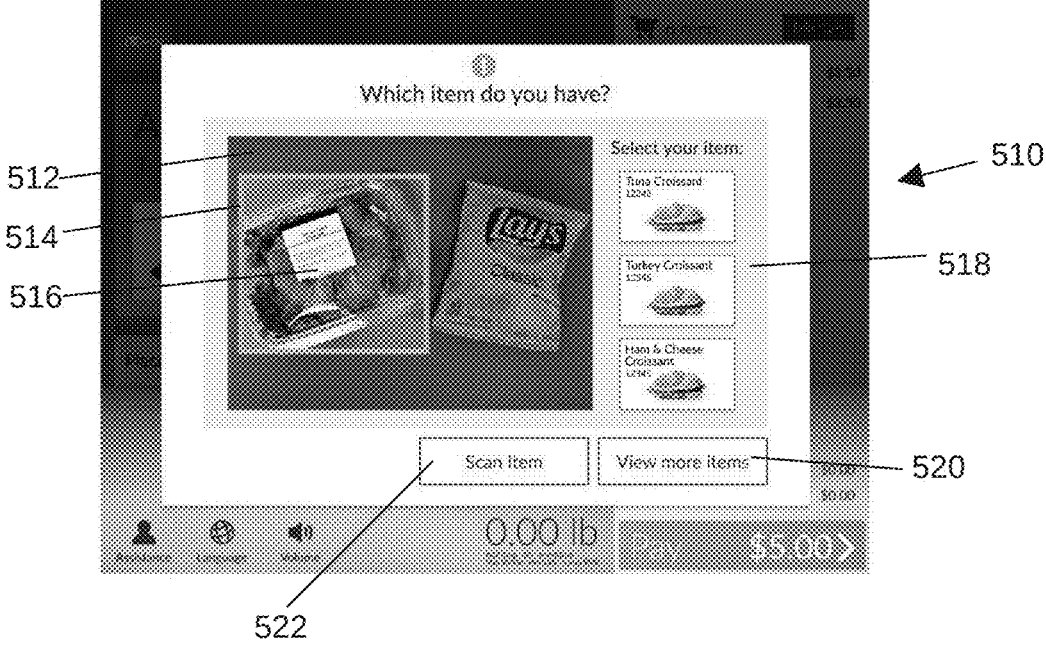
FIG. 10 is the display screen that may be shown for items that cannot be identified visually during the vision scan portion of the operation of the method of the current disclosure.

Some items, e.g., store packaged items like prepared food such as sandwiches, pizzas, etc., are not able to be identified with training, and thus must always be separately processed by either scanning or using a picklist. When a store packaged item is identified (step 335) (a third type of error) during the vision checkout process, the processing proceeds to step 340 where a store packaged item screen 510 (FIG. 10) is displayed on display 162. The store packaged item screen 510 provides a view 516 of the store packaged item on the checkout tray 210, the view 516 surrounded by a bounding box 514 and the remaining part 512 of the checkout tray 210 blurred or otherwise blacked out to aid in identifying the location of the store packaged item. The user is provided with three options in addressing the unrecognized item. First, the user may select one of the items shown in a suggested item area 518 of screen 510. Next, the user may select a "view more items" button 520 or a "scan item" button 522. When the user selects the "view more items" button 520, screen 490 is displayed (FIG. 9B) which allows the user to ender an item number or code in a text box 492 using a keypad 494 to search for the store packaged item, e.g., via a picklist. When the user selects the "scan item" button 522, screen 500 is displayed which provides a view 506 of the unrecognized item on the checkout tray 210, the view 506 surrounded by a bounding box 504 and the remaining part 502 of the checkout tray blurred or otherwise blacked out to aid in identifying the location of the store packaged item. As discussed above, the user is then instructed to use the hand-held scanner to identify the item, etc.

Figure 11:
FIG. 11 is the display screen that may be shown for attendant assistance during the vision scan portion of the operation of the method of the current disclosure.

When an item identified by the vision scan system and added to the purchase list needs to be removed (step 245) during the vision checkout process, the user selects the assist button 415 and the screen 530 shown in FIG. 11 is displayed on display 162. The item to be removed 534 can be identified and will be surrounded by a bounding box 532. An attendant will be summoned upon selection of the assist button 415, and the attendant will complete the process of removing the unwanted item.

When the system loses contact with the server that performs the vision identification (step 355), the user will be instructed to complete the transaction using only the barcode scanner (step 360).

Figure 12A:
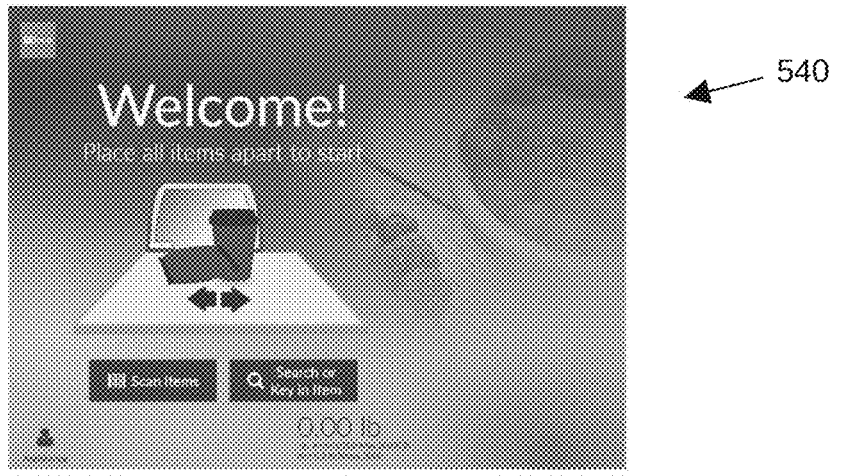
FIGS. 12A, 12B, 12C and 12D are the display screens that may be shown for a barcode scan at terminals having a flatbed barcode scanner during the operation of the method of the current disclosure.
Figure 12B:
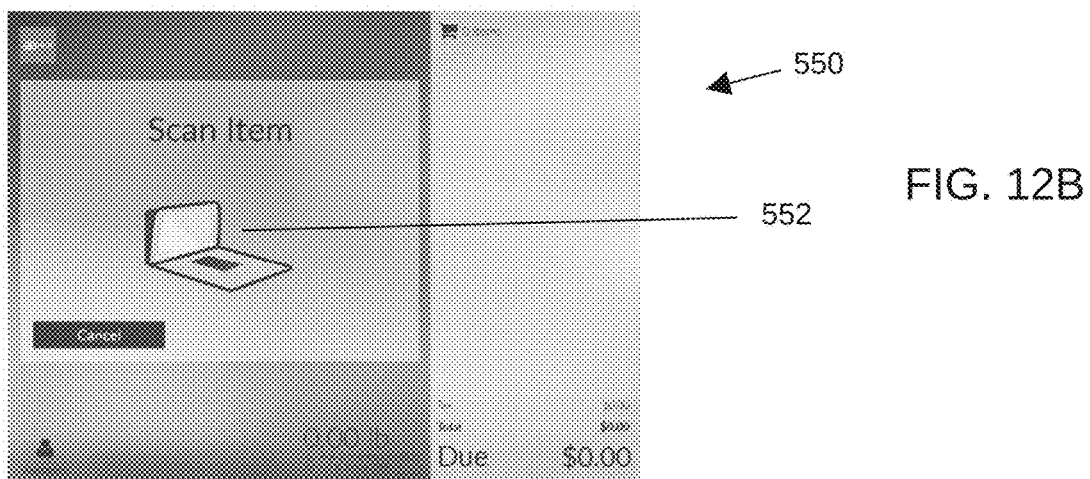
Figure 12C:
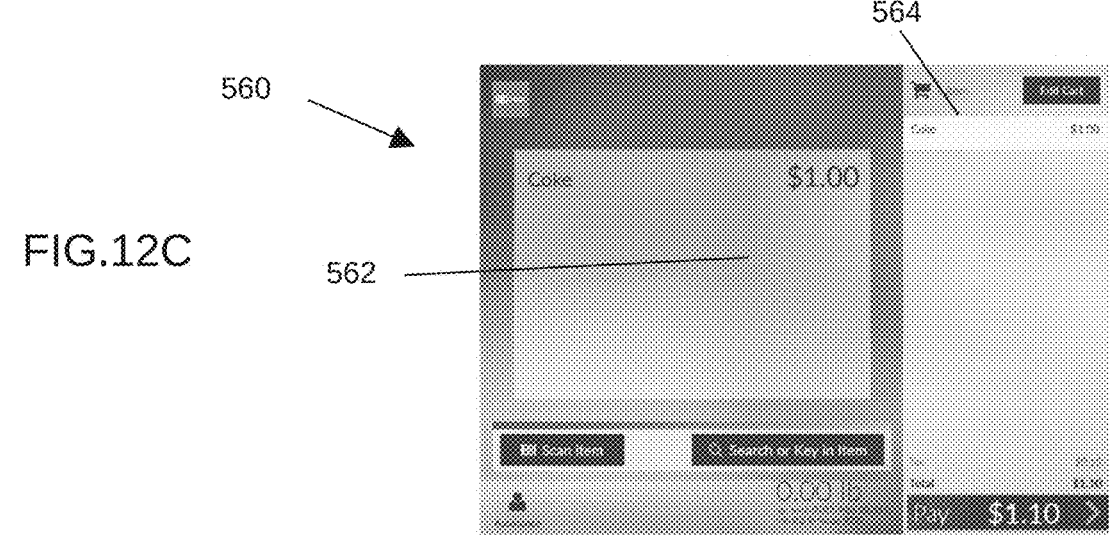
Figure 12D:
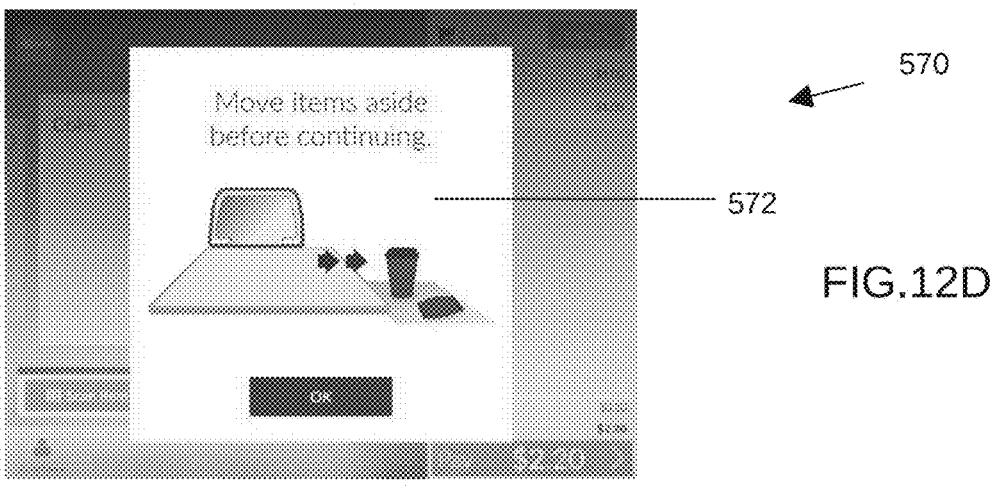

In some embodiments, the vision-based self-service checkout terminal may include a flatbed style barcode scanner, instead of a handheld barcode scanner. For these terminals, an initial screen 540 on display 162 is provided that shows the scanner elements adjacent to the checkout tray 210 (FIG. 12A). The user will be prompted to scan an item via the message 552 of the screen 550 shown in FIG. 12B, when, for example, a scan item button is selected. A screen 560 shown in FIG. 12C shows the results of the scanning in area 562, and the item is entered into the current transaction list 564. Finally, a screen 570 (FIG. 12D) provides a message 572 instructing the user to move the scanned item aside before continuing.

Figure 13:
FIG. 13 is the completion display screen shown during the operation of the method of the current disclosure.

Once processing is completed and all items have been entered into the current transaction list, the user will be instructed to complete payment. Once payment is received, the screen 600 of FIG. 13 will be shown to the user on display 162.

The screen flow provided in the system and method of the present invention provide new Key Performance Indicators (KPIs) for tracking performance. Some existing KPIs, such as transaction speed, can be used to compare to existing self-checkout terminals. The new KPIs are the ones described in this solution. These KPIs include: a. the number of transactions with unrecognized items; b. the number of unrecognized items sold by barcode scanning; c. the number of unrecognized items sold via suggestions; d. the number of unrecognized items sold by picklist search/selection; e. the number of unrecognized items removed as not store items; and f. the number of vision items voided. These KPIs are prepared at the item level and transaction level, in order to determine how successful each item sale was and how successful each transaction was.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A self-service checkout system, comprising:
 a computing device having a processor and a non-transitory computer-readable storage medium;
 a set of cameras coupled to the computing device and having a predefined field of view focused on a scan zone, each of the set of cameras providing respective output images of the scan zone to the computing device;
 a display
 a checkout tray within the scan zone; and
 wherein the non-transitory computer-readable storage medium in the computing device includes executable instructions that, when executed by the processor, cause the processor to:

prompt a user to begin a transaction by presenting a welcome message on the display;
 forward output images from the set of cameras to a machine learning model trained to identify items on the checkout tray during the transaction once no movement is detected on the checkout tray;
 receive from the machine learning model an identification of an error state designating a particular error and, in response, provide the user with an error message on the display identifying the particular error;
 forward output images from the set of cameras to the machine learning model to determine when the error state has been cleared;
 when the error state has been cleared, forward output images from the set of cameras to the machine learning model trained to identify the items on the checkout tray; and
 receive from the machine learning model an identification of the items on the checkout tray and add the identification of the items to a list of items to be purchased shown on the display.

2. The self-service checkout system of claim 1, wherein the error message on the display identifying the particular error includes an image of the display, a bounding box overlaid on the image around at least one item among the items on the checkout tray that caused the error message, and an indication of the particular error.

3. The self-service checkout system of claim 2, wherein the particular error is one of overlapping items and an item protruding over an edge of the checkout tray.

4. The self-service checkout system of claim 2, wherein the particular error is an unrecognized item and the error message on the display provides a suggested list of items for the unrecognized item.

5. The self-service checkout system of claim 2, wherein the particular error is an unrecognized item and the error message on the display provides the user with access to a search list to identify the unrecognized item.

6. The self-service checkout system of claim 2, wherein the particular error is an unrecognized item and the error message on the display allows the user to elect to access a barcode scanner to identify the unrecognized item.

7. The self-service checkout system of claim 2, wherein the particular error is an store packaged item and the error message on the display provides a suggested list of items for the store packaged item.

8. The self-service checkout system of claim 2, wherein the particular error is a store packaged item and the error message on the display provides the user with access to a search list to identify the store packaged item.

9. The self-service checkout system of claim 2, wherein the particular error is an store packaged item and the error message on the display allows the user to elect to access a barcode scanner to identify the store packaged item.

10. A method of operating a self-service checkout system, comprising:
 prompting a user to begin a transaction by presenting a welcome message on a display;
 forwarding output images from a set of cameras to a machine learning model trained to identify items on a checkout tray during the transaction once no movement is detected on the checkout tray;
 receiving from the machine learning model an identification of an error state designating a particular error and, in response, providing the user with an error message on the display identifying the particular error;

forwarding output images from the set of cameras to the machine learning model to determine when the error state has been cleared;

when the error state has been cleared, forwarding output images from the set of cameras to the machine learning model trained to identify the items on the checkout tray; and receiving from the machine learning model an identification of the items on the checkout tray and add the identification of the items to a list of items to be purchased shown on the display.

11. The method of claim 10, wherein the error message on the display identifying the particular error includes an image of the display, a bounding box overlaid on the image around at least one item among the items on the checkout tray that caused the error message, and an indication of the particular error.

12. The method of claim 11, wherein the particular error is one of overlapping items and an item protruding over an edge of the checkout tray.

13. The method of claim 11, wherein the particular error is an unrecognized item and the error message on the display provides a suggested list of items for the unrecognized item.

14. The method of claim 11, wherein the particular error is an unrecognized item and the error message on the display provides the user with access to a search list to identify the unrecognized item.

15. The method of claim 11, wherein the particular error is an unrecognized item and the error message on the display allows the user to elect to access a barcode scanner to identify the unrecognized item.

16. The method of claim 11, wherein the particular error is an store packaged item and the error message on the display provides a suggested list of items for the store packaged item.

17. The method of claim 11, wherein the particular error is a store packaged item and the error message on the display provides the user with access to a search list to identify the store packaged item.

18. The method of claim 11, wherein the particular error is an store packaged item and the error message on the display allows the user to elect to access a barcode scanner to identify the store packaged item.

* * * * *